United States Patent Office 3,373,757
Patented Mar. 19, 1968

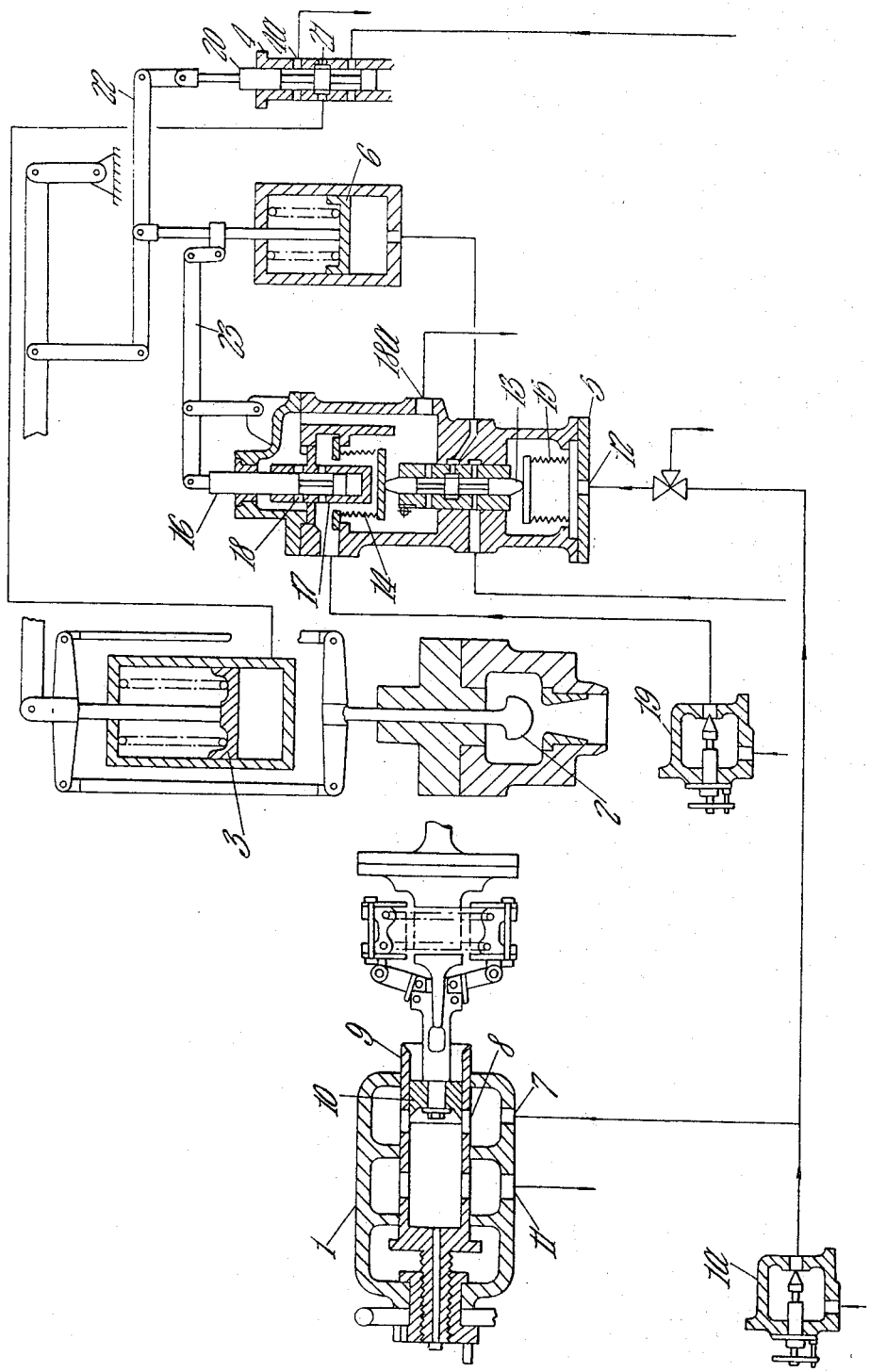

3,373,757
SPEED GOVERNING SYSTEM WITH HY-
DRAULICALLY OPERATED COMPEN-
SATING DEVICE
William George Watson, Newcastle-upon-Tyne, England,
assignor to C. A. Parsons & Company Limited, New-
castle-upon-Tyne, England, a company of Great Britain
Filed June 7, 1965, Ser. No. 461,674
Claims priority, application Great Britain, June 15, 1964,
24,780/64
2 Claims. (Cl. 137—34)

ABSTRACT OF THE DISCLOSURE

A speed governing system for a steam turbine incorporating a governor operable responsive to a change in the turbine speed for varying the pressure in a hydraulic system operated by the governor and provided with a valve for controlling the flow of steam to the turbine in which a compensating device sensitive to changes in the pressure in the hydraulic circuit and the pressure in a separate feedback circuit operable for varying the opening of the valve is provided. The compensating device includes a control movable responsive to a change in the pressure of the hydraulic system for altering the valve opening and at the same time for altering the opening of ports in the compensating device for changing the pressure of fluid in the feedback circuit in a non-linear relationship to the movement of the control member. Hence, the relationship between change of pressure in the hydraulic system and the movement of the control member is made non-linear for compensating for the non-linear relationship between the valve opening and the flow of steam.

---

This invention relates to speed governing systems for steam turbines.

It is common practice to control the speed and load of large steam turbine plant such as that used in large electrical power stations by means of governing systems which are basically hydraulic systems. In a typical system a change in turbine speed as a result of a change in load on the turbine alters the governor setting on the turbine and this produces a change in pressure in oil or other hydraulic fluid used in the system. The change in pressure in this fluid alters the position of relays associated with valves controlling the admission of steam to the turbine. The change of position of the relays effects a change in the valve opening to adjust the flow of steam to the turbine to the new load conditions on the turbine.

It is desirable to have, as near as possible, a linear relationship between percentage speed change and load on the turbine and it is known to fit cam gears to the valve relays to compensate for a non-linear relationship which exists between valve lift and steam admitted to the turbine.

The object of the present invention is to provide a speed governing system for a steam turbine, which enables a linear relationship between percentage speed change and load to be achieved without resort to cams.

The invention consists in a speed governing system for a steam turbine, incorporating a governor operable in response to a change in turbine speed to vary the pressure in a hydraulic system including a valve controlling the flow of steam to the turbine, a compensating device sensitive to changes in the said pressure and to the pressure in a separate feed back circuit in the device and operable to vary the opening of the valve, said compensating device incorporating a control member movable in response to a change in the pressure in the hydraulic system to alter the valve opening and at the same time to alter the opening of ports in the device to change the pressure of fluid in the feed back circuit in non-linear relationship to the movement of said control member whereby the relationship between change of pressure in the hydraulic system and movement of the control member is made non-linear so as to compensate for the non-linear relationship between valve opening and steam flow.

The invention also consists in a speed governing system in accordance with the preceding paragraph in which the compensating device comprises a first plunger movable to control ports in a fixed bush, a bellows at each end of the plunger, one bellows being sensitive to changes in pressure in the hydraulic system and the other bellows being sensitive to changes in pressure in the feed back fluid circuit, occurrence of a pressure change in the hydraulic system causing the bellows to move the plunger to alter the pressure in a hydraulic fluid actuating the said control member operating the valve, said control member actuating a second plunger in the compensating device which plunger controls the opening of the ports in the feed back fluid circuit.

The invention also consists in a speed governing system substantially as described hereinbelow with reference to the accompanying drawing which shows a speed governing system in accordance with one embodiment of the invention.

In carrying the invention into effect in the form illustrated by way of example a speed governing system for a steam turbine comprises a governor 1 driven by the turbine, a governor valve 2, a power piston 3 for actuating the governor valve, a relay 4 for controlling the pressure of oil or other hydraulic fluid actuating the power piston 3, and a compensating device 5 described in detail below incorporating a control member 6 in the form of an auxiliary power piston.

The hydraulic system connecting the above components may contain oil or fire resistant fluid or a combination of these or other appropriate fluids. For the sake of simplicity it will be assumed that the hydraulic fluid is oil. The hydraulic system is in two parts a pilot oil circuit and a power oil circuit.

Pilot oil at pressures in the region of say 100 lbs./sq. in. is supplied to governor 1 through a pre-set regulating valve 1a and inlet 7 and flows through ports 8 in a sleeve 9 under the control of plunger 10. Pilot oil leaving ports 8 flows to drain through outlet 11. Changes in turbine speed alter the position of the plunger 10 thus altering the opening of ports 8 and varying the pressure of the pilot oil, the relationship between the pilot oil pressure and percentage speed change being substantially linear.

Connected to the pilot oil circuit is compensating device 5. Pilot oil enters device 5 through inlet 12 and passes to the inside of a bellows 15, referred to below.

The device 5 comprises a first plunger 13 which is actuated by bellows pistons 14 and 15 located at opposite ends thereof. Plunger 13 controls the flow of oil from the same source as the pilot oil or from a separate source at a similar pressure, to the control member 6 and also controls the release of oil from this member. The device also comprises a second plunger 16 which controls the flow of oil in a separate feed back circuit within the device. The plunger 16 moves in a fixed bush 17 to control the flow of oil through ports 18 in the bush.

The separate feed back circuit is supplied with oil from the same source as the pilot oil or from a separate source at a similar pressure through a pre-set regulating valve 19 and the oil flows to drain through the ports 18 and 18a. Variations of the opening of ports 18 has the effect of varying the pressure of the oil in the feed back circuit. The oil in the feed back circuit also passes to the inside of bellows piston 14. When the pressure in the pilot oil and the pressure in the feed back circuit are equal the plunger 13 is held in a neutral position. In this position supply of oil to or release of oil from member 6 is cut off and member 6 is thus held in a fixed position. If there is a difference of pressure between the pilot oil and the oil in the feed back circuit the plunger 13 moves.

Power oil at pressures in the region of say 1000 lbs./sq. in. is supplied to the power piston 3 under the control of relay 4 with opening 4a to drain. The relay 4 incorporates a plunger 20 the movement of which in a ported bush 21 is controlled by the member 6 through lever 22. Plunger 20 controls the flow of power oil to the power piston 3 and also the release of oil therefrom.

The member 6 also controls movement of plunger 16 through lever 23.

In operation, if as a result of the action of the governor 1, the pilot oil pressure should increase, the pressure in bellows 15 rises above that in bellows 14 and the plunger 13 moves upwards. Oil will now be admitted to the control member 6 causing it to rise and actuate the relay 4 to increase the lift of the valve 2 by permitting power oil to pass to main power piston 3. At the same time upward movement of the member 6 lowers plunger 16 to reduce the port opening 18 in bush 17 and hence increase the oil pressure in the feed back circuit.

Increase of pressure in the feed back circuit increases the pressure in bellows 14 and when the pressure rises to equal the pressure in bellows 15 the plunger 13 moves back to its neutral position cutting off the supply of oil to control member 6.

Conversely a decrease of pilot oil pressure as a result of governor action causes plunger 13 to move downwards and release oil from member 6 which in turn moves downwards thus releasing oil from the power piston 3 and reducing the lift of the valve 2.

The control port openings 18 in bush 17 are shaped to give a non-linear relationship betwen oil pressure in the feed back circuit and movement of the member 6.

Thus changes in the pilot oil pressure produced by the governor alter the position of the member 6 in a non-linear manner and, because movement of the valve 2 is proportional to movement of the member 6, the said valve movement has a non-linear relationship with the governor pilot oil pressure. In this way compensation for the non-linear relationship between the valve opening and steam admission is obtained and thus the load on the turbine is proportional to percentage change of speed at all valve openings.

Whilst in the system described a relay 4 is provided for controlling the flow of power oil to power piston 3 other arrangements can be used for causing movement of control member 6 to alter the valve opening. Likewise variations in the construction of compensating device 5 may be made.

I claim:

1. A speed governing system for a steam turbine provided with a governor operable responsive to a change in turbine speed for varying the pressure in a hydraulic system operated by such governor and a valve for controlling the flow of steam to the turbine, comprising a hydraulically operated compensating device, said compensating device including a control means connected to the valve so that movement of the control means produces a change in valve opening, the relationship between movement of the control means and the valve opening being linear, a feedback circuit, a control relay for controlling the supply of fluid to actuate the control means, said control relay being operable responsive to the difference in pressure between fluid in the hydraulic and fliud in the feedback circuit, the movement of the control means being transmitted to a component in the feedback circuit which moves to control the opening of ports provided in the feedback circuit for altering the pressure in the feedback circuit in a non-linear fashion and to cause the control means to move in a non-linear manner relative to changes in pressure in the hydraulic system to compensate for the non-linear relationship between the valve opening and the flow of steam.

2. A speed governing system for a steam turbine, incorporating a governor operable in response to a change in turbine speed to vary the pressure in the hydraulic system including a valve controlling the flow of steam to the turbine, a compensating device sensitive to changes in the pressure and to the pressure in a separate feedback circuit in the device and operable to vary the opening of the valve, said compensating device incorporating a control member movable in response to a change in the pressure in the hydraulic system to alter the valve opening and at the same time to alter the opening of ports in the device to change the pressure of fluid in the feedback circuit in non-linear relationship to the movement of said control member whereby the relationship between change of pressure in the hydraulic system and movement of the control member is made non-linear so as to compensate for the non-linear relationship between valve opening and steam flow, said compensating device comprising a first plunger movable to control ports in a fixed bushing, a bellows at each end of the plunger, one of said bellows being sensitive to changes in pressure in the hydraulic system and the other bellows being sensitive to changes in pressure in the feed back fluid circuit, with the occurrence of a pressure change in the hydraulic causing the bellows to move the plunger to alter the pressure in a hydraulic fluid actuating the said control member operating the valve, and said control member actuating a second plunger in the compensating device which controls the opening of the ports in the feed back fluid circuit.

References Cited

UNITED STATES PATENTS

| 1,966,225 | 7/1934 | Standerwick | 137—34 |
| 2,126,533 | 8/1938 | Caughey | 137—36 |
| 2,333,454 | 11/1943 | Van Nest | 91—366 X |
| 2,371,793 | 3/1945 | Bourland | 137—34 |
| 2,472,896 | 6/1949 | Gottlieb | 137—36 X |
| 2,621,301 | 12/1952 | Schwendner | 137—34 X |
| 3,152,601 | 10/1964 | Krenikoff | 137—36 |

CLARENCE R. GORDON, *Primary Examiner.*